Jan. 8, 1963   R. P. RAMIREZ ET AL   3,072,164
SAW BLADE
Filed Dec. 28, 1959   3 Sheets-Sheet 1
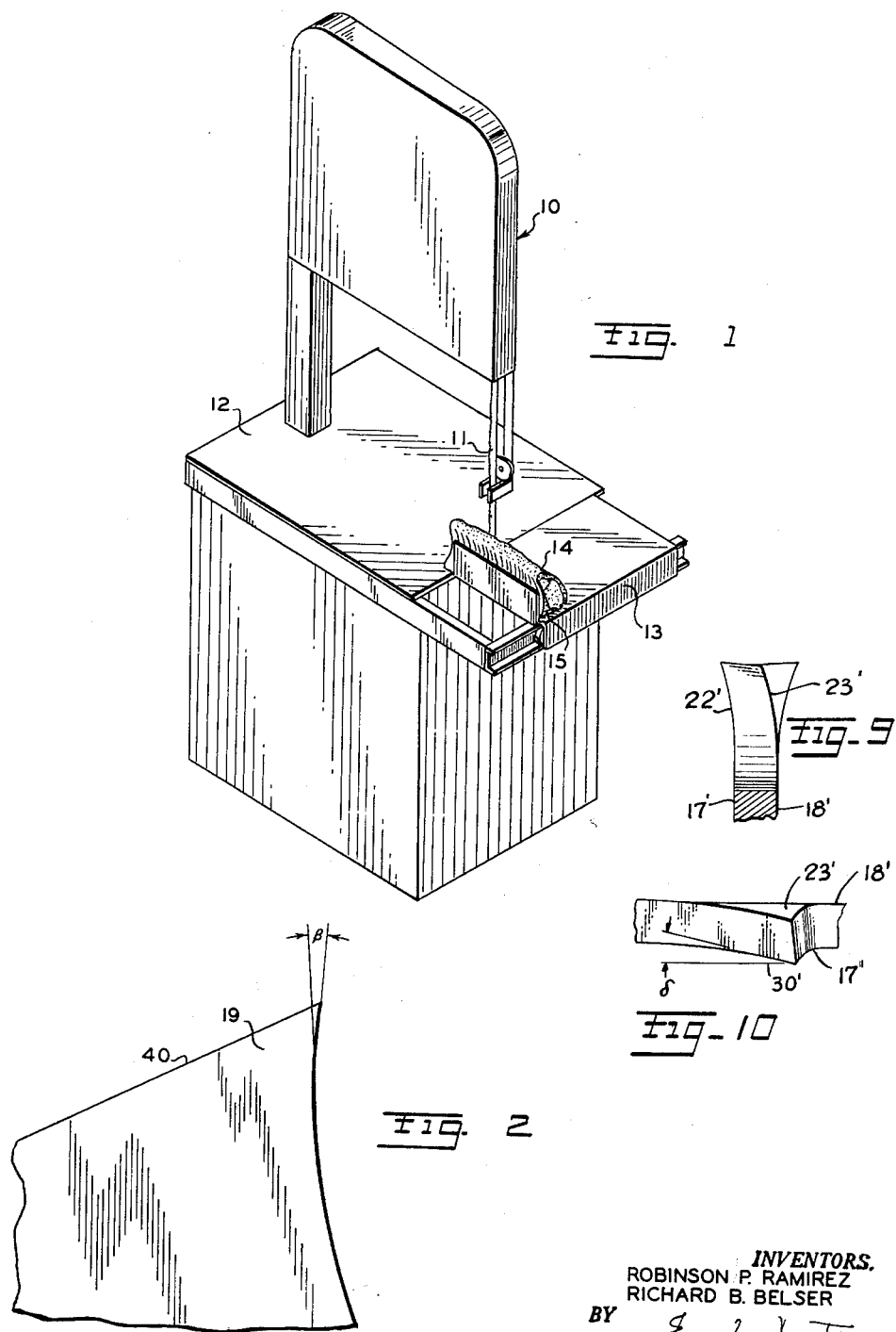
INVENTORS.
ROBINSON P. RAMIREZ
RICHARD B. BELSER
BY
ATTORNEY Jan. 8, 1963

R. P. RAMIREZ ET AL 3,072,164

SAW BLADE

Filed Dec. 28, 1959

INVENTORS.
ROBINSON P. RAMIREZ
RICHARD B. BELSER
BY

ATTORNEY

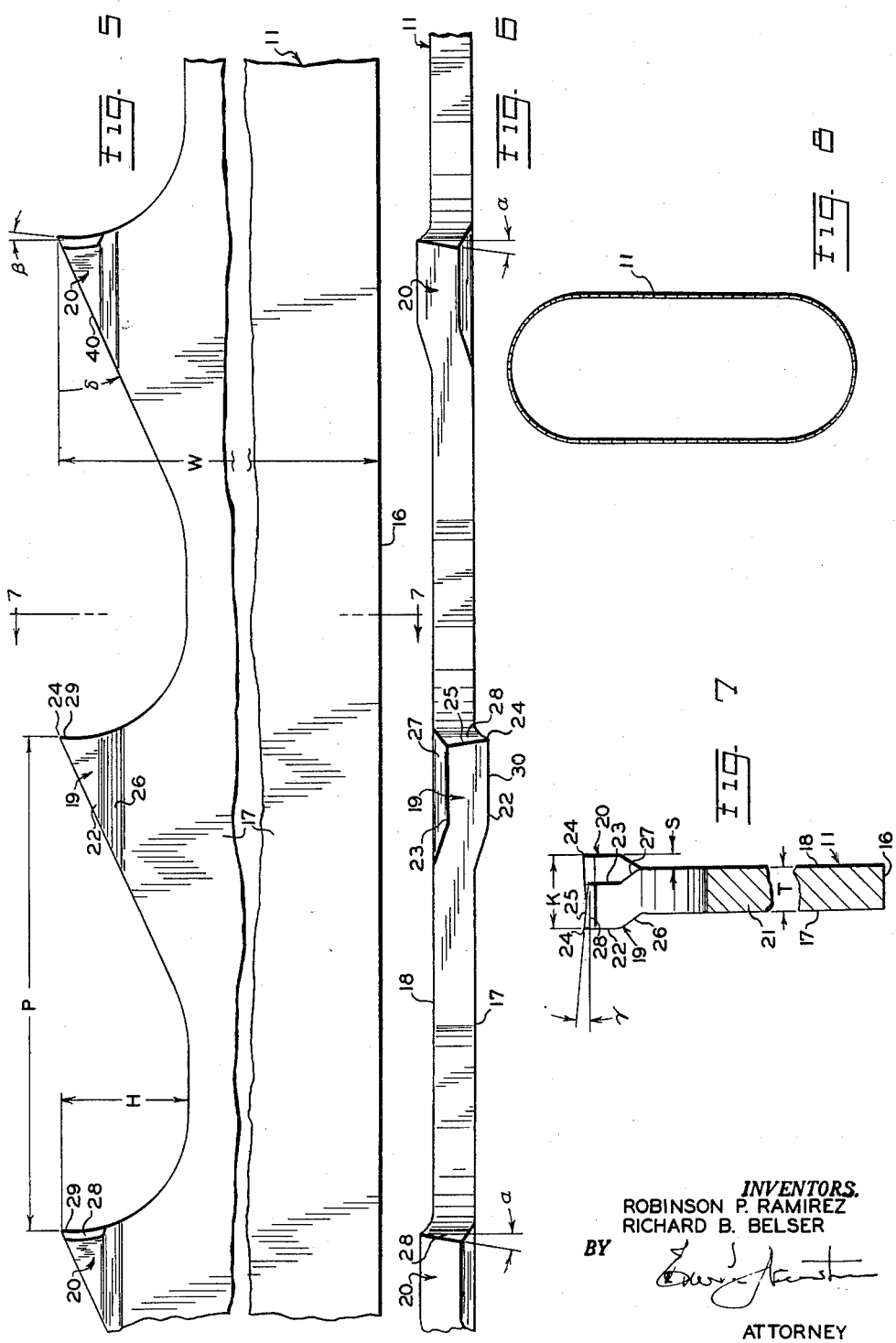

United States Patent Office 3,072,164
Patented Jan. 8, 1963

3,072,164
SAW BLADE
Robinson P. Ramirez and Richard B. Belser, Atlanta, Ga., assignors to Southern Saw Service, Inc., Atlanta, Ga., a corporation of Georgia
Filed Dec. 28, 1959, Ser. No. 862,131
20 Claims. (Cl. 146—88)

This invention relates to a saw blade and is more particularly concerned with a band saw blade for the cutting of meat and bone.

Although band saws date back to perhaps prehistoric times, the practical band saw awaited the development of steel strips which could be joined to form a continuous belt without weakness or deformation at the joint. As early as 1808 a band saw patent was issued in England; however, the use of band saws was limited to a few centralized water powered belt driven assemblies, the first installations being used primarily in sawmills and in furniture manufacturing plants.

With the advent of small power plants such as internal combustion engines and electric motors, other industries began employing band saws and recently, the meat processing industries have employed such band saws extensively.

Although band saws which cut wood and metal will also cut meat and bone, such saws do so inefficiently. In addition, whereas wood and metal are usually cut in a dry environment, meat and bone are cut in an environment comprising a saline solution formed by the fluids from the meat. Blades for cutting meat are also usually subjected to sudden load changes and fluctuating stresses when passing from meat to bone and to the usual bending stress of passing around the rollers or pulleys of the band saw. Thus, it is seen that a band saw blade is especially subject to the phenomena of fatigue cracking and of stress corrosion cracking, which are the principal controlling factors in the blade life. As a result, band saw blades require design considerations that are somewhat more critical than band saw blades employed for other purposes.

Little attention has been paid to the development of a band saw blade to be used primarily for meat and bone cutting. Indeed, in the past, blades developed primarily for the cutting of wood and/or metal have been employed for cutting meat and bones. Such prior art blades, as well as blades offered for meat cutting purposes, tend to waste meat in appreciable quantities and to smear the meat as it is cut, making it less attractive to the purchaser. It has been estimated by one supermarket chain that an average of 2% of meat is lost as a result of waste and additional labor in handling is required to remove the smear. With the large supermarket chains operating on a relatively low mark-up and high volume, a 2% loss is appreciable, especially when it may be reduced by the utilization of properly designed band saws.

In the art of meat processing band saws, there are two major considerations, namely, blade life and sharpness life. The ideal band saw blade should have a blade life about equal to the sharpness life so that the blade remains sharp throughout its life. The two requirements are not, however, especially compatible since, if the blade is formed of soft steel which is not as susceptible to fatigue and stress corrosion cracking as hard steel, the teeth also are soft and easily dulled. If, however, the metal of the blade is very hard, so as to insure teeth which remain sharp, the blade is highly susceptible to fatigue and stress corrosion cracking. When operated in cutting meat a band saw blade always breaks at the gullet between adjacent teeth since the gullet contains the point of greatest stress. To reduce susceptibility to breaking, some prior art blades have utilized the relatively soft steels; however, as pointed out above, the teeth of the blade tend to become dull quickly and the blade must be removed and sharpened several times during its life.

The prior art blade shave attempted to overcome this problem in two ways, either by using a harder steel or by hardening the teeth of the blade. Of course, using soft steel and hardening the teeth of the blade is a difficult and expensive proposition because each tooth must be heated within controlled limits without appreciably heating the body portion of the blade. In some instances, hard substances, such as Carborundum and other hard oxides, have been added to the teeth of the soft steel blade to provide a very hard tip for each tooth; however, this also is expensive and difficult and has been used only for cutting wood, metal and plastic substances where an electrolytic medium such as meat juice was not present.

The logical answer, therefore, in most instances, has been to go to a uniformly hard steel blade of a hardness of about 45–55 Rockwell C. In so doing, the cross section of the blade may be somewhat reduced, thereby reducing the amount of metal required. This, however, does not solve the problem, in meat and bone cutting blades, but rather tends to magnify the tendency of the blade to break due to the setting up of high stresses in the gullet region of the blade. These points of high stress are subject to the initiation of cracks as a result of stress corrosion cracking in the electrolytic medium of meat. Added to this cracking due to corrosion is that due to fatigue during flexure of the blade undergoing successive bends while passing over the pulleys. Other undetermined forces are exerted by the butcher in forcing the blade through meat and bone. Thus, the combination of corrosion cracking and fatigue cracking makes the very hard blade very susceptible to breakage.

It should be noted that the gullet between each pair of teeth forms a notch; this notch forms a point of high stress leading to the phenomenon known as notch embrittlement which we have found is greatly magnified the more sharply is the radius along the inner portion of the gullet.

The teeth, too, have a marked effect upon blade life. If the teeth are dull or if it is necessary for the unsharpened portion of the blade to gouge out a portion of the bone, the stresses are very high and these stresses are transmitted to and concentrated in the gullet region.

On a meat cutting band saw, the teeth serve two functions which may best be described as a slicing action in the meat and a chiseling action in the bone. Since the meat will readily move, there is little need to provide a kerf in the meat any wider than the actual slice necessary to sever the meat. Thus, where no bone is present, usually the butcher employs a rotary slicer having a continuous smooth sharp edge and there is essentially no need for a band saw. Such smooth slicing action leaves no smear and there is essentially no loss of meat due to the slice.

On the other hand, if bone is to be encountered, the teeth must function as successive chisels which progressively dig into the bone until it is cut. The kerf cut in this instance must be greater than the width of the body of the band saw so that the body portion of the band saw does not bind within the kerf. To do so, successive teeth must be offset in opposite directions.

By very careful analysis of the several factors contributing to blade efficiency, blade life and blade sharpness, we have devised a band saw which is inexpensive to produce and yet has both an appreciably longer blade life and an appreciably longer sharpness life than blades commonly used by the meat cutting industry. This blade also is very efficient in its cutting operations.

Briefly, the present invention includes a blade specifically developed and designed for high efficiency in cutting the heterogeneous structure of meat normally encountered in the butchering of an animal carcass. The blade itself has a particular configuration for each tooth so as to reduce the forces tending to break the blade. The gullet between the teeth is formed of two continuous substantially circular arcs of fixed radii one of which gradually merges into a bone cutting rake angle at the tip of the blade and the second of which forms the rear slope of the preceding tooth. In addition an angle is applied to the face of each tooth to constitute a meat cutting rake angle. This is done by filing each tooth automatically. Alternate teeth in the blade are offset in opposite directions by a given amount and there are fixed ratios between various dimensions of the blade.

Accordingly, it is an object of the present invention to provide a band saw blade having a high cutting efficiency, a low smear development and a long life.

Another object of our invention is to provide a band saw blade which is particularly suited for cutting meat and bone separately or combined.

Another object of our invention is to provide a meat cutting band saw blade which will not appreciably smear the meat with bone or meat detritus as the meat is cut.

Another object of our invention is to provide a band saw blade which does not appreciably tear or grind the meat which it cuts.

Another object of our invention is to provide a band saw blade which will remain sharp for an extended period of time.

Another object of our invention is to provide a saw blade which will retain its set for an extended period of time in use.

Another object of our invention is to provide a saw blade which is superior to prior art saw blades and yet is relatively inexpensive to manufacture.

Other objects, features and advantages of the present invention will become apparent from the following description when taken in conjunction with the accompanying drawings wherein like characters of reference designate coresponding parts throughout the several views and wherein:

FIG. 1 is a perspective view of a conventional band saw having a blade constructed in accordance with the present invention.

FIG. 2 is an enlarged fragmentary side elevational view showing one tooth of the band saw blade of the present invention, prior to the time the tooth is set and sharpened.

FIG. 5 is an enlarged fragmentary side elevation of a portion of the band saw blade of the present invention in complete form, the teeth having been set and sharpened.

FIG. 6 is a plan view of that portion of the blade shown in FIG. 5.

FIG. 7 is a cross sectional view taken along line 7—7 in FIG. 5.

FIG. 8 is a perspective view on a reduced scale of the completed band saw blade.

FIG. 9 is a fragmentary cross sectional view similar to FIG. 7, showing a modified form of the present invention.

FIG. 10 is a top plan view of a portion of the saw blade shown in FIG. 9.

Figure 3:
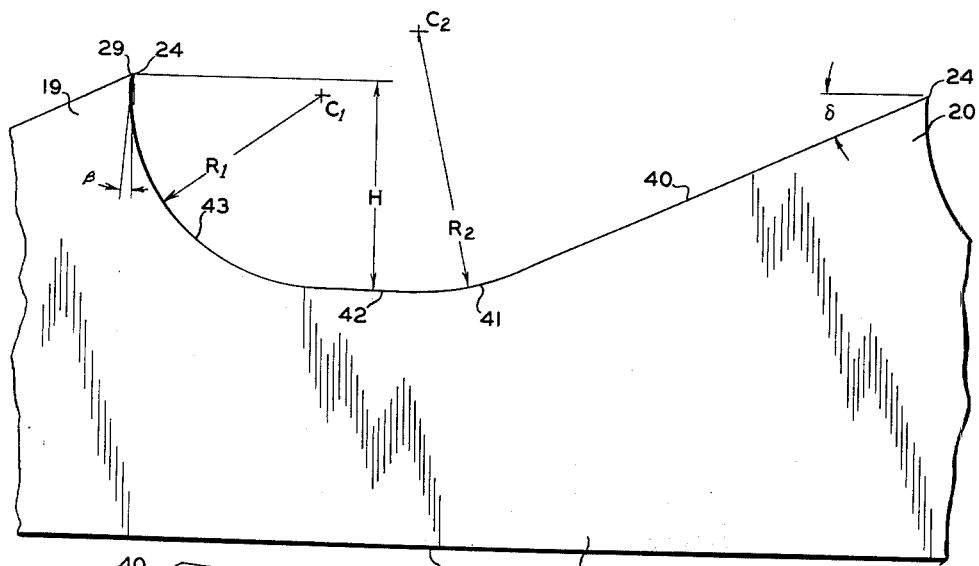
FIG. 3 is an enlarged fragmentary side elevational view of a portion of the band saw blade of the present invention, showing the profile of the blade prior to the time the teeth are set and sharpened.

Referring now in detail to the embodiment chosen for the purpose of illustrating the present invention, numeral 10 in FIG. 1 denotes generally a conventional meat cutting band saw having a continuous blade 11 constructed in accordance with the present invention. The blade 11 passes over a pair of pulleys (not shown) in the band saw 10. The band saw also has the customary work table 12 and work carriage 13, such as is disclosed in U.S. Patent No. 2,585,957, for carrying the meat 14 having bone 15 into the path of the blade 11. By employing such an arrangement, the lateral pressure exerted by the meat 14 to urge the blade 11 out of its normal path is reduced.

The blade 11 itself is produced from a steel band of uniform hardness throughout which is rectangular in shape, having a back edge 16, a pair of parallel sides 17 and 18, and a front edge defining a plurality of evenly spaced teeth with gullets between the teeth. As is customary, the front edge forms the cutting surface which intermittently engages the meat 14 and bone 15 as a portion of a carcass is cut or sliced. It will be understood by those skilled in the art that the teeth of blade 11 may be hardened if desired without departing from the scope of the present invention.

Our blade 11 is installed in a conventional manner on the band saw so that the down coming flight of the continuous blade 11 engages and cuts the heterogeneous mixture of meat, bone and gristle, each tooth successively cutting or chiseling in a vertical path to form a kerf in the meat 14 and/or bone 15.

TOOTH TIP

It is well known that only the first or forwardmost portion or tip region of each tooth actually severs the material to be cut and that the portion of the blade behind that foremost portion serves primarily as a carrier for this foremost portion. The gullet region between each blade serves as a recess region to receive the material removed from the kerf by the teeth.

According to the preferred embodiment each alternate tooth 19, as shown in FIGS. 5, 6 and 7, is offset laterally of the blade 11 in the tip region by an amount equivalent to about one-third the thickness of the blade 11; the other teeth 20 between each tooth 19 are offset in the opposite direction by a like amount. Thus the effective cutting thickness of the blade 11 is about one and two-thirds times the actual thickness of the body portion 21 of the blade, as best seen in FIG. 7.

It is to be remembered that the tooth region such as that shown in FIG. 2 is the non-critical region of the blade 11 and therefore the tip or tip region may be internally stressed to a greater extent without appreciable danger of setting up severe stresses in the blade 11 which result in the blade being broken.

Each of teeth 19 and 20 is defined by teeth sides such as sides 22 and 23 which lead from the tip 24 and cutting edge 25 inwardly parallel to and offset from sides 17 and 18 of body 21. These sides 22 and 23 are joined to sides 17 and 18 by angularly disposed inwardly tapering regions defined by side portions 26 and 27.

The external tip of the tip region 24 serves mainly to cut the meat and hence the face of the tooth is beveled inwardly at the forward portion of the tooth to provide a beveled or meat cutting surface area 28 having a meat cutting rake angle α subtended between the plane of the meat cutting surface 28 and a transverse or lateral plane through the blade. In addition, the leading edge of each tooth is inclined forwardly at the tip region to provide a bon cutting area or edge 29, the inclination from the transverse or lateral plane being defined by angle β of FIG. 2.

Of course, the exact configuration of the blade teeth in the tip region may be varied, as will be pointed out hereinafter. It is nevertheless preferable both to bevel the meat cutting area at numeral 28 and incline the tooth tip forwardly at numeral 29. The beveling provides a sharp tip region adjacent tip 24 while at the same time a chisel-like edge 25 is provided to chip away the bone. The angle β insures that the blade will be fed inwardly with respect to the material to be cut and provides the proper chisel-like sharpened edge 25. This bone cutting angle β should be sufficiently large to present a cutting edge to the surface of the bone and at the same time apply a small self feeding action to the blade. However, it should not be so large that its slope is not capable of merging with the gullet region without sharp bends.

In some instances, it may be found desirable to tilt the sides 22′ and 23′ as shown in FIG. 9 so that they define an angle of set with respect to the sides 17′ and 18′ and gradually merge therewith. In such instances there will be provided a small meat cutting relief angle S between the upper edge 30′ of the tooth and the side 17′ or 18′ as shown in FIG. 10. The tooth may also be inclined inwardly from tip 24 in a lateral direction so that the tip 24 is the highest portion, the inclination angle γ being seen in FIG. 7.

With such a construction as defined above a most effective tooth is provided which will retain its sharpness for extended periods of time. Since the set is applied to only a small tip region occupying the upper one-third of the tooth height H, very little lateral pressure from the meat will be exerted to tend to remove the set imparted to the blade.

It will be recognized that for maximum cutting efficiency, a specific number of teeth per inch (pitch) should be provided and that this number should be as large as practical within certain limits related to the properties of the material being cut. For meat and bone this number should not be more than about 4½ teeth per inch. For blades having a greater number than 4½ teeth per inch, the necessary depth of the gullet dictates a very rapid rate of change for the profile of the gullet and a corresponding increase in likelihood of damage due to notch embrittlement as will be discussed hereinafter. Thus, preferably, tooth pitch should be from 3½ to 4½ teeth per inch and not less than 3 nor more than 5 teeth per inch.

TOOTH PROFILE

As pointed out above, the gullet region from a standpoint of blade life is critical; at least the inner two-thirds of the gullet region is extremely critical. Any small cracks, notches or the like along this region rapidly develop into breaks. Thus while the tip region has some effect on blade life, it is the gullet region in which the blade will break. It will be understood, however, that the sharpness of the tooth and its efficiency will determine to a certain extent the amount of stresses transmitted to the gullet region under given load conditions and hence may indirectly be responsible for blade breakage.

Figure 4:
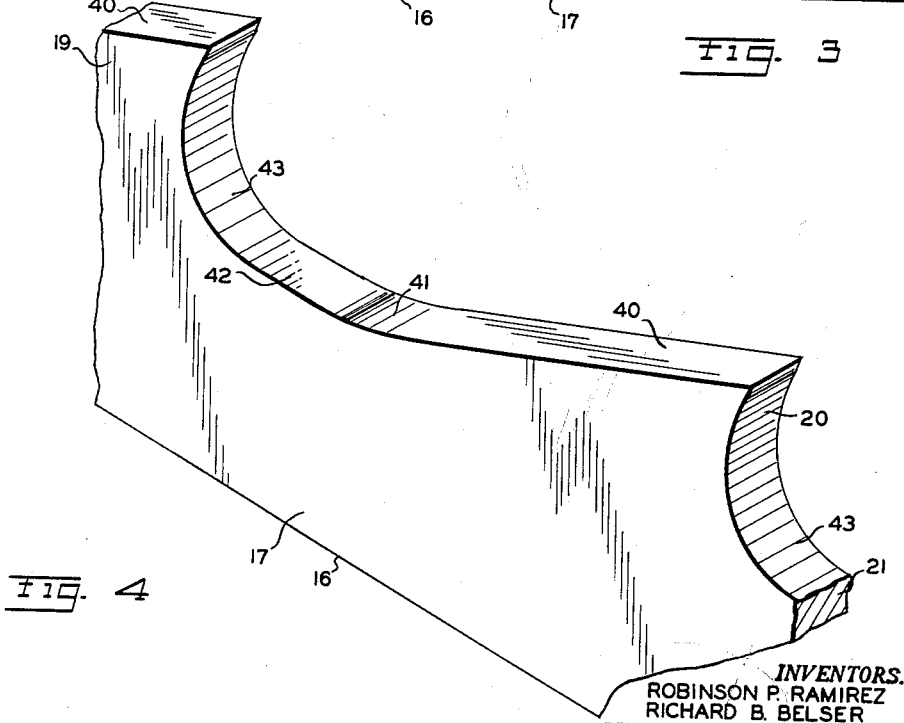
FIG. 4 is a perspective view of that portion of the blade shown in FIG. 3.

Referring now to FIGS. 2, 3 and 4 wherein the semi-finished blade is shown, the entire gullet is defined by a recess leading from the tip 24 of one tooth 19 or 20 to the tip 24 of the next adjacent tooth 20 or 19.

Leading rearwardly from the tip 24 of each tooth 19 or 20 is a top land 40 forming an acute angle δ with respect to the longitudinal axis of the blade.

In the semi-finished blade as shown in FIGS. 2, 3 and 4, the top land 40 is straight from tip 24 to a position where it becomes tangential to the forward arcuate gullet portion 41 having a radius $R_2$. The arcuate gullet portion 41 merges with a bottom land 42 which lies parallel to the longitudinal axis of the blade 11. The bottom land 42 extends rearwardly in a straight line for a short distance and then merges tangentially at the base of the gullet with a rear arcuate gullet portion or root fillet portion 43 which extends rearwardly and outwardly to merge tangentially with the cutting edge 29. The radius of the root fillet portion 43 is illustrated by letter $R_1$. In the profile as seen in FIG. 3, it will be observed that the center $C_1$ of radius $R_1$ is slightly below the line between the tips 24 of the teeth. Also, the center $C_2$ is above this line of centers and forwardly of center $C_1$.

It will be understood that the set and filing of the blade, if properly carried out, do not appreciably affect the dimensions or configuration of the profile of the blade 11.

PREFERRED EMBODIMENT

In the preferred embodiment of our invention, the following dimensions will provide a blade having a long useful and sharp life.

Table I

| | | |
|---|---|---|
| Tooth height, H | inch | .065 |
| Blade width, W | do | .625 |
| Distance between teeth, P | do | .25 |
| Blade thickness, T | do | .022 |
| Blade kerf, K | do | .034 |
| Lateral tooth set, S | do | .006 |
| Blade hardness | Rockwell C | 53 |
| Meat cutting rake angle | degrees | 12 |
| Bone cutting rake angle | do | 5 |
| Tooth incline angle | do | 0 |
| Bone cutting relief angle | do | 26 |
| Meat cutting relief angle | do | 0 |
| Tooth fillet radius $R_1$ | | .060 |
| Forward gullet radius $R_2$ | | .160 |

Table II

| | | Minimum | Maximum |
|---|---|---|---|
| Tooth Height, H | inches | 0.06 | 0.075 |
| Blade Width, W | do | .50 | 1.0 |
| Distance between Teeth, P | do | .200 | .333 |
| Blade Thickness, T | do | .010 | .025 |
| Blade Kerf, K | do | .014 | .045 |
| Lateral Tooth Set, S | do | .002 | .010 |
| Blade Hardness | Rockwell C | 50 | 56 |
| Meat Cutting Rake Angle | degrees | 8 | 45 |
| Bone Cutting Rake Angle | do | 0 | 12 |
| Tooth Incline Angle | do | 0 | 15 |
| Bone Cutting Relief Angle | do | 25 | 60 |
| Tooth Fillet Radius $R_1$ | inches | 0.030 | 0.072 |
| Forward Gullet Radius $R_2$ | do | .130 | .200 |

When a blade is to be hardened at its tips, only the upper one-half of the tooth should be hardened. In other words, if the tooth height H were .06 inch, only the outer .03 inch of the tip would be hardened. In this instance, the hardness of the blade body should be from 35 to 55 Rockwell C and the hardness of the tip or hardened portion should be from 60 to 70 Rockwell C.

For best results, however, certain relationships should be observed. For example, the radius $R_1$ to tooth height H should be between 8:10 and 9.5:10. The tooth height H to body width W should be between 1:10.0 and 1:11.3. $R_1$ should not be less than .060 inch. $R_2$ should be between .155 and .165 inch. The bone cutting rake angle β should be from 3° to 7°. The meat cutting rake angle α should be from 10° to 14°. The ratio of thickness T to total width W should be from 1:20 to 1:50.

To test out the quality of a blade constructed in accordance with the present application, samples of the profiles of various blades employed for cutting meat were made and subjected to photoelastic stress analysis. Table III gives the results of these tests:

Table III

RANKING OF BLADES BASED ON ACTUAL STRESS CONCENTRATIONS AND STRESS DISTRIBUTION IN THE TOOTH AND GULLET REGIONS

| Description of Blade | Rank | $K_2$ | Remarks |
|---|---|---|---|
| Present Invention | 1 | 1.54 | Excellent. |
| Sample A (skiptooth) | 2 | 2.16 | Good. |
| Sample B (skiptooth) | 3 | 2.51 | Good. |
| Sample C (skiptooth) | 4 | 2.65 | Good. |
| Sample D (skiptooth) | 5 | 2.57 | Good. |
| Sample E (.045 inch gullet) | 6 | 2.51 | Good. |
| Sample F (skiptooth) | 7 | 3.06 | Poor. |
| Sample G (.15 inch gullet) | 8 | 3.30 | Poor. |

In Table III, $K_2$ represents the stress concentration factor.

We have found also that a tooth constructed in accordance with the present invention will have a useful life of about five to eight times the life of some prior art blades presently being employed for cutting meat and bone.

It will be obvious to those skilled in the art that many variations may be made in the embodiment herein disclosed by way of illustration without departing from the scope of our invention as defined by the appended claims.

We claim:

1. A band saw blade comprising a continuous rectangular band formed of spring steel, said band having a straight back edge, a pair of parallel sides and a front edge, a plurality of teeth along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth.

2. A band saw blade comprising a continuous rectangular band formed of spring steel of uniform hardness, said band having a straight back edge, a pair of parallel sides and a front edge, a plurality of teeth along said front edge of said band, said teeth having points at their outer extremities provided with gullets therebetween, each of said teeth having a top land tapering inwardly and rearwardly from its point in a straight line, said gullet being defined by a pair of arcuate concave gullet portions, one of said gullet portions having a relatively small radius with a center between a line of said points and said gullet, the other of said gullet portions having a relatively large radius with a center beyond and forwardly of said center of said one of said gullet portions, said top land merging with said other of said gullet portions, said one of said gullet portions being tangentially aligned with said other of said gullet portions and extending rearwardly and outwardly therefrom, there being provided a cutting surface on each of said teeth, said cutting surface merging with said one of said gullet portions, said cutting surface projecting in a straight line outwardly and forwardly and terminating at the point of a tooth.

3. A band saw blade comprising a continuous rectangular band formed of spring steel of hardness greater than 50 Rockwell C, said band having a straight back edge, a pair of parallel sides and a front edge, a plurality of teeth along said front edge of said band, said teeth having points at their outer extremeties, said blade being provided with gullets between said teeth, each of said teeth having a cutting surface with a bone cutting rake angle of less than 12° and a meat cutting rake angle of between 8° and 45°, said gullet being defined by a pair of arcuate concave gullet portions, said one of said gullet portions being tangentially aligned with said other of said gullet portions and extending rearwardly and outwardly therefrom, said cutting surface merging with said one of said gullet portions, said cutting surface projecting in a straight line outwardly and forwardly at angle less than 12° and terminating at the point of a tooth.

4. A band saw blade comprising a continuous strip of metal, said blade having evenly spaced teeth along its front edge and a straight back edge, there being provided between adjacent teeth on said blade a gullet region which is defined by a pair of arcuate concave gullet portions, said gullet portions merging at the base of said gullet region and extending outwardly forwardly and rearwardly in arcs in diverging paths respectively toward said adjacent teeth, and there being provided inwardly extending portions extending from the tips of said adjacent teeth and merging with said arcs, one of said inwardly extending portions being straight and about normal to the axis of said blade, the teeth in the region of each portion normal to said axis being provided with sharp cutting edges.

5. A band saw blade comprising a continuous strip of metal, said blade having evenly spaced teeth along its front edge and a straight back edge, there being provided between adjacent teeth on said blade a gullet region which is defined by a pair of arcuate concave gullet portions, said gullet portions merging at the base of said gullet region and extending in arcs in diverging forwardly extending and rearwardly extending paths respectively toward said adjacent teeth, and there being provided inwardly extending portions extending from the tips of said adjacent teeth and merging with said arcs, one of said inwardly extending portions being straight and about normal to the axis of said blade, the teeth in the region of each portion normal to said axis being provided with sharp cutting edges, the other of said inwardly extending portions being straight and extending at an angle with respect to said one of said inwardly extending portions, said inwardly extending portions being tangential to the gullet portions with which they merge.

6. A band saw blade comprising a continuous strip of metal, said blade having evenly spaced teeth along its front edge and a straight back edge, there being provided between adjacent teeth on said blade a gullet region which is defined by a pair of arcuate concave gullet portions, said gullet portions merging at the base of said gullet region and extending in arcs in diverging paths respectively forwardly and rearwardly toward said adjacent teeth, and there being provided inwardly extending portions extending from the tips of said adjacent teeth and merging with said arcs, the center of the arc of one gullet portion lying outside of a straight line between said adjacent teeth, the center of the arc of the other of said gullet portions being between said gullet region and said line.

7. A band saw blade comprising a continuous strip of metal, said blade having evenly spaced teeth along its front edge and a straight back edge, there being provided between adjacent teeth on said blade a gullet region which is defined by a pair of arcuate concave gullet portions, said gullet portions merging at the base of said gullet region and extending in arcs in diverging paths respectively toward said adjacent teeth, and there being provided inwardly extending portions extending from the tips of said adjacent teeth and merging with said arcs, the center of the arc of one gullet portion lying outside of a straight line between said adjacent teeth, the center of the arc of the other of said gullet portions being between said gullet region and said line, said adjacent teeth being offset in opposite directions, the ratio of the radius of the arc having its center between said gullet and said line to the tooth height being between 8:10 to 9.5:10.

8. A band saw blade comprising a continuous metal band having spaced teeth along one edge and a straight back, there being provided a gullet region between adjacent teeth defined by a first arc and a second arc merging with each other along the base of said gullet and extending in opposite directions forwardly and rearwardly toward respective of said adjacent teeth, there being provided a sharp edge between the tip of one of said adjacent teeth and said first arc, the height of said teeth being defined by the distance from the base of said gullet region to a line intersecting the tips of the teeth, the ratio of the radius of said first arc to said height being between 8:10 and 9.5:10.

9. A band saw blade comprising a continuous metal band having spaced teeth along one edge and a straight back, there being provided a gullet region between adjacent teeth defined by a first arc and a second arc merging with each other along the base of said gullet and extending in opposite directions toward respective of said adjacent teeth, there being provided a sharp edge between the tip of one of said adjacent teeth and said first arc, the height of said teeth being defined by the distance from the base of said gullet region to a line intersecting the tips of the teeth, the ratio of the radius of said first arc to said height being between 8:10 and 9.5:10, the ratio of the height to the width of said blade being between 1:10 and 1:11.3.

10. A band saw blade comprising a continuous metal band having spaced teeth along one edge and a straight back, there being provided a gullet region between adjacent teeth defined by a first arc and a second arc merging with each other along the base of said gullet and extending in opposite directions toward respective of said adjacent teeth, there being provided a sharp edge between the tip of one of said adjacent teeth and said first arc, the height of said teeth being defined by the distance from the base of said gullet region to a line intersecting the tips of the teeth, the ratio of the radius of said first arc to said height being between 8:10 and 9.5:10, the ratio of the height to the width of said blade being between 1:10 and 1:11.3, there being provided between 3 and 5 teeth per inch along said blade, said first arc having a radius of not less than .060 inch.

11. A band saw blade comprising a continuous metal strip having spaced teeth along one edge, and there being provided a gullet region between adjacent teeth and a sharpened edge along each tooth, said gullet region being defined by a first arc and a second arc merging with said first arc, there being provided between 3 and 5 teeth per inch, the radius of said first arc being not less than .060 inch and the radius of said second arc being between .155 and .165 inch.

12. A band saw blade comprising a continuous rectangular band formed of steel, said band having a straight back edge, a pair of parallel sides and a front edge, a plurality of teeth along said front edge of said band, said teeth having points at their outer extremities, said blade being provided with gullets between said teeth, the distance between said points being from .200 inch to .333 inch, there being provided along the front edge of each tooth a straight cutting surface, said cutting surface being inclined in the direction of travel of said blade and provided with a bone cutting rake angle of less than 12°, there being provided along the back edge of each tooth a straight top land leading from the tip of each tooth into the gullet between that tooth and the next rearwardly adjacent tooth, said gullets each being defined by an arcuate concaved root fillet having a radius of between .030 and .072 inch, said root fillet merging with said top land and said cutting surface, said root fillet being about tangential to said cutting surface.

13. A band saw blade comprising a continuous rectangular band formed of spring steel, said band having a straight back edge, a pair of parallel sides and a front edge, a plurality of teeth along said front edge of said band, said teeth having points at their outer extremities, said blade being provided with gullets between said teeth, the distance between said points being from .200 inch to .333 inch, there being provided along the front edge of each tooth a straight cutting surface, there being provided a bone cutting rake angle of less than 12° along said straight cutting surface, said cutting surface being inclined in the direction of travel of said blade, there being provided along the back edge of each tooth a straight top land leading from the tip of each tooth into the gullet between that tooth and the next rearwardly adjacent tooth, said gullets each being defined by an arcuate concaved root fillet having a radius of between .030 and .072 inch, said root fillet merging with said top land and said cutting surface, said tooth being provided with a bevel defining a meat cutting rake angle of from 8° to 45°.

14. In a band saw blade having a flat body with a straight back, a tooth extending from the front of said body, said tooth having a minor portion forming a tip region and a major portion forming a gullet region which extends in both axial directions beyond said tip region, said tip region having a relatively small cutting surface, said gullet region having an arcuate leading edge merging with the cutting surface of said tip region and being concaved, the ratio of the radius of curvature of said leading edge to the height of said tooth being between 8:10 and 9.5:10.

15. A band saw blade comprising a continuous rectangular band formed of spring steel, said band having a straight back edge, a pair of parallel sides and a front edge, a plurality of from three to five teeth per inch along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth.

16. A band saw blade comprising a continuous rectangular band formed of spring steel, said band having a straight back edge, a pair of parallel sides and a front edge, a plurality of teeth along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth, said tooth having a kerf of from .014 to .045 inch.

17. A band saw blade comprising a continuous rectangular band formed of spring steel, said band having a straight back edge, a pair of parallel sides and a front edge, a plurality of teeth along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth, said tooth having a kerf of from .014 to .045 inch, and a bone cutting rake angle of 0° to 12°.

18. A band saw blade comprising a continuous rectangular band formed of spring steel, said band having a straight back edge, a pair of parallel sides and a front edge, a plurality of teeth along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth, and a bone cutting rake angle of 0° to 12°.

19. A band saw blade comprising a continuous rectangular band formed of spring steel, said band having a straight back edge, a pair of parallel sides and a front edge, a plurality of teeth along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth, said tooth having a kerf of from .014 to .045 inch, a lateral tooth set of .002 to .010 inch, and a bone cutting rake angle of 0° to 12°.

20. A band saw blade comprising a continuous rectangular band formed of spring steel, said band having a straight back edge, a pair of parallel sides and a front edge, a plurality of from three to five teeth per inch along said front edge of said band, alternate of said teeth being offset in opposed directions, said teeth having points at their outer extremities, said blade being provided with gullets between said teeth, each of said teeth having a top land tapering inwardly and rearwardly from its point, said gullet being defined by an arcuate concave root fillet having a radius between .030 and .072 inch, said root fillet merging with the top land of the adjacent forward tooth and extending rearwardly and outwardly therefrom, there being provided a cutting surface on each of said teeth, said cutting surface merging with said root fillet, said cutting surface projecting in a straight line outwardly and forwardly and terminating at the point of a tooth, said tooth having a kerf of from .014 to .045 inch, a lateral tooth set of .002 to .010 inch, a meat cutting rake angle of 8° to 45° and a bone cutting rake angle of 0° to 12°.

References Cited in the file of this patent

UNITED STATES PATENTS 2,826,941 Kolesh _____ Mar. 18, 1958

FOREIGN PATENTS 584,301 Great Britain _____ Jan. 10, 1947